United States Patent [19]

Millot et al.

[11] Patent Number: 4,701,296
[45] Date of Patent: Oct. 20, 1987

[54] FUEL ARRAY FOR AN UNDERMODERATED NUCLEAR REACTOR

[75] Inventors: Jean-Paul Millot, Elancourt; Patrice Alibran, Paris; Guy Desfontaines, Puteaux, all of France

[73] Assignee: Framatome & Cie., Courbevoie, France

[21] Appl. No.: 748,136

[22] Filed: Jun. 24, 1985

Related U.S. Application Data

[63] Continuation of Ser. No. 442,214, Nov. 16, 1982, abandoned.

[30] Foreign Application Priority Data

Dec. 4, 1981 [FR] France ............... 81 22751

[51] Int. Cl.$^4$ ............... G21C 3/30; G21C 1/00
[52] U.S. Cl. ............... 376/172; 376/346; 376/419; 376/434; 376/436; 376/443
[58] Field of Search ............... 376/172, 173, 436, 346, 376/434, 444, 443, 419

[56] References Cited

U.S. PATENT DOCUMENTS

| | | | |
|---|---|---|---|
| 3,147,191 | 9/1964 | Crowther | 376/173 |
| 3,215,606 | 11/1965 | Silvester | 376/444 |
| 3,317,399 | 5/1967 | Winders | 376/435 |
| 3,379,615 | 4/1968 | Halliday | 376/346 |
| 3,930,940 | 1/1976 | Cayol et al. | 376/436 |
| 4,522,781 | 6/1985 | Schluderberg | 376/434 |

FOREIGN PATENT DOCUMENTS

| | | | |
|---|---|---|---|
| 929286 | 6/1973 | Canada | 376/346 |
| 1391095 | 1/1965 | France | 376/434 |
| 1098623 | 1/1968 | United Kingdom | 376/346 |

OTHER PUBLICATIONS

"Introduction to Nuclear Reactor Theory", Addison-Wesley Publishing Co. Inc., Lamarsh, pp. 204–207.
"Nuclear Reactor Engineering", Third Ed., Van Nostrand Reinhold Co., Glasstone et al, p. 764.

*Primary Examiner*—Harvey E. Behrend
*Attorney, Agent, or Firm*—Pollock, Vande Sande & Priddy

[57] ABSTRACT

Fuel array for an undermoderated nuclear reactor, comprising rods (6) arranged in a prism-shaped casing (1) parallel to the height of this casing (1). The internal surface of each of the walls (2) of the casing (1) is provided with channels (5) each of the channels (5) is located opposite a rod (6) arranged at the periphery of the array. The projecting parts (9) of the walls (2), between two channels (5), occupy part of the space between two peripheral rods (6). In this way, the moderating level remains constant throughout the cross-section of the array.

The invention applies, in particular, to pressurized water reactors.

5 Claims, 1 Drawing Figure

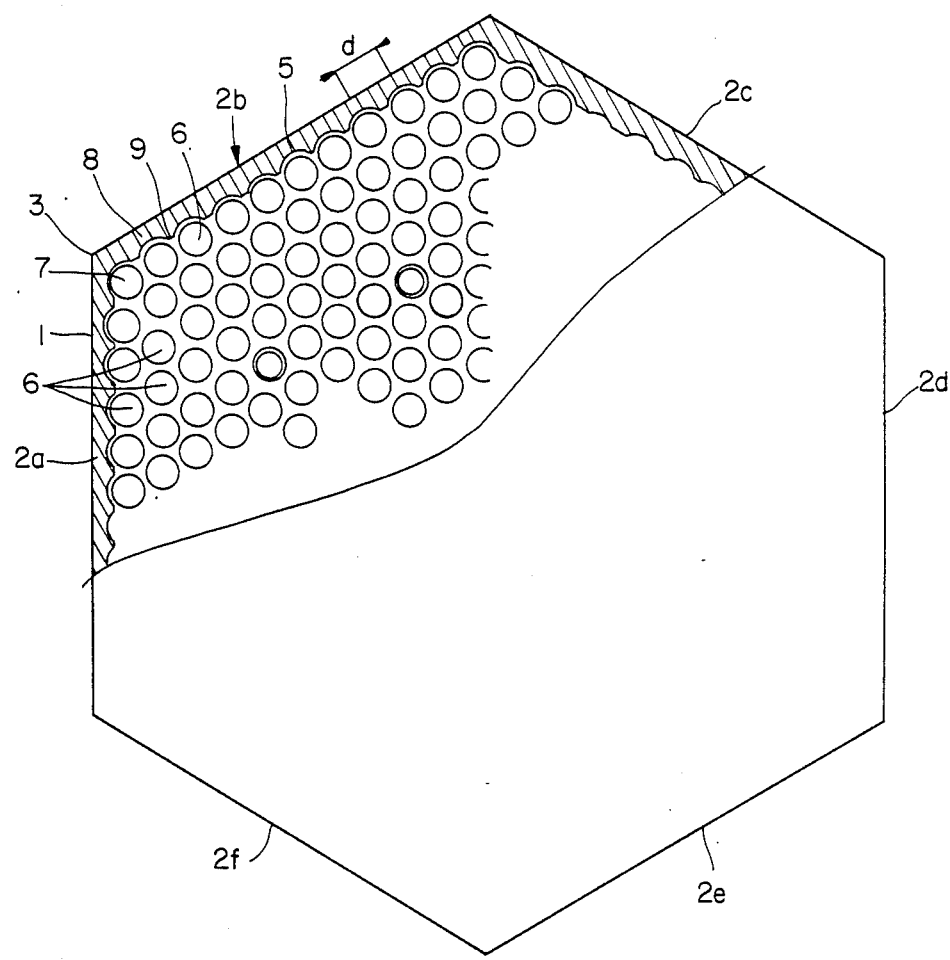

FUEL ARRAY FOR AN UNDERMODERATED NUCLEAR REACTOR

This application is a continuation of application Ser. No. 442,214, filed Nov. 16, 1982, now abandoned.

FIELD OF THE INVENTION

The invention relates to a fuel array for an undermoderated nuclear reactor.

BACKGROUND OF THE INVENTION

A reactor of this type comprises a core consisting of fuel arrays of two different types, arranged side by side. Some of them, referred to as "fissile arrays", mainly contain a fissile material, whereas the others, referred to as "fertile arrays", contain a material which is capable of being converted to fissile material under the action of neutron bombardment. The fertile arrays are generally arranged at the periphery of the core, where they collect the neutron radiation produced by the fissile arrays.

The reactor core is immersed in a moderating fluid, such as water, which generally also serves as a heat-transfer fluid. This fluid circulates in contact with the fuel elements arranged inside the arrays.

Compared with pressurized water nuclear reactors of the conventional type, which only comprise fissile arrays, the undermoderated reactor has a very much lower ratio of volume of moderator/volume of fissile material in the core, or moderating ratio $VM/VU$, whereby the energy spectrum of the neutrons is very different.

This spectrum is intermediate between that of a conventional pressurized water reactor, in which the neutrons are very slow, and that of fast reactors, in which the neutrons are not slowed down.

The energy spectrum of the neutrons in undermoderated reactors is said to be "epithermal".

This epithermal spectrum of neutrons makes it possible to produce fissile material from fertile material arranged, for example, at the periphery of the core. A low moderating ratio is obtained, in so-called "undermoderated" reactors, by making provision for a distribution of the fuel material in the fissile arrays which ensures optimum contact with the moderator and at the same time a low volume ratio of the moderator to the fissile material.

Whether fissile or fertile, the fuel arrays generally consist of a prism-shaped casing made of a weakly neutron-absorbing material, such as a zirconium alloy, inside which long tubular rods, containing the fissile material or the fertile material, are arranged parallel to the height of the casing and in a uniform lattice in the cross-sections of this casing. These rods of fuel material consist of a tube made of canning material, filled with pellets containing the fissile or fertile material. These rods, arranged parallel to one another in the array, form a bundle, the spacing between the rods being maintained by spacer devices, such as wires wound in a helix around the can of the rods, or ribs and roughnesses provided on this can. Such arrangement enables the heat-transfer and moderating fluid to circulate in contact with the whole surface of the rod while permitting a very small spacing between the rods, i.e., that it makes it possible to obtain a very dense lattice in which, however, the cans of the rods are never contiguous. This high-density lattice of rods of fissile material makes it possible to obtain a low moderating factor.

It is nevertheless difficult to ensure a constant moderating level throughout the cross-section of a fuel array for an undermoderated nuclear reactor; in particular, in the region of the peripheral zones of the array, the moderating level varies considerably because of the presence of a relatively thick sheet of water in the region of the wall in the zone between two successive rods.

This can result in a deterioration of the performance characteristics of undermoderated reactors.

SUMMARY OF THE INVENTION

The object of the invention is therefore to propose a fuel array for an undermoderated nuclear reactor comprising a core immersed in a moderating fluid and consisting of fuel arrays arranged side by side, some mainly containing a fissile material and the other containing a fertile material which is capable of being converted to fissile material under the action of neutron bombardment, each of the arrays of the core consisting of a prism-shaped casing, inside which long rods containing the fissile material or the fertile material, are arranged parallel to the height of the casing and in a uniform lattice in the cross-sections of this casing, with a small spacing between the rods, this fuel array making it possible to obtain a virtually constant moderating ratio in the cross-sections of the array.

For this purpose, on the internal surface of each of the lateral walls of the casing, channels are produced parallel to the height of the casing, so that a channel is located opposite each of the rods placed at the periphery of the array, the spacing maintained between the external surface of said rods placed at the periphery of the array and the surface of said channels being virtually constant and virtually equal to the spacing between the rods of the array, resulting in a sheet of moderating fluid of small and virtually constant thickness around the rods in the peripheral zones and in the internal zones of the array as well.

BRIEF DESCRIPTION OF THE DRAWINGS

In order to provide a clear understanding of the invention, an embodiment of a fissile fuel array according to the invention, in the case where this array has a hexagonal cross-section, will now be described by way of example, with reference to the attached singe drawing.

This FIGURE shows a section view through a plane perpendicular to the height of the casing, of an array, according to the invention, of hexagonal cross-section.

DETAILED DESCRIPTION OF PREFERRED EMBODIMENT

The single FIGURE shows the casing 1 of the array, the cross-section of which has a hexagonal shape, this casing consisting of stainless steel walls 2a, 2b, 2c, 2d, 2e and 2f, welded to one another, along the edges 3 of the array, by electron bombardment.

On the internal face of each of the walls 2, before assembly cylindrical channels 5 are produced, by rolling or machining, over the entire height of the wall, with a spacing d corresponding to the pitch of the fissile fuel rods 6 of the array.

These fissile fuel rods are arranged inside the casing in a uniform lattice with triangular meshes, a certain spacing being maintained by virtue of wires wound in a helix around the rods.

The fuel rods 6 arranged at the periphery of the array are each placed opposite a channel 5, so that the axis of the channel and the axis of the rod are located in one and the same plane perpendicular to the wall 2 of the casing.

The rods 6 at the periphery of the array are furthermore placed in the immediate vicinity of the wall, whereby the sheet of water 8 existing between the rod and the channel has a very small thickness, corresponding to the thickness of the spacer device used, and so that the projecting part 9 of the wall, located between two channels, occupies part of the space existing between two successive rods 6.

In this way, the sheet of water existing between the rods 6 and the wall has a small thickness at all points on the periphery of the array.

As a result, the moderating factor remains low in this zone of the array and at a value which is entirely comparable to its value in the central parts of the cross-section of the array.

Thus, it has been possible to measure a moderating ratio of 0.60 at the periphery of the array, whereas the average moderating ratio for the remainder of the array is 0.51.

In the case where a casing is used, of which the internal surface of the walls is plane, the moderating ratio increases considerably in the region of these walls and assumes a value of more than 1.4.

It will be seen that the device of the invention although very simple, makes it possible to solve problems associated with the effect on the moderating ratio of the peripheral sheets of water in the arrays.

It is possible further to improve the performance characteristics of the array and to increase the amount of fertile material converted to fissile material by arranging, for example on the periphery of the array, a partial or complete layer of fertile fuel rods of natural or depleted uranium, instead of a layer of fissile fuel rods.

The corner rods 7 can comprise a consumable poison, such as samarium or gadolinium, introduced into the fuel pellets by impregnation.

If the walls are made of stainless steel, the manufacture of the array is greatly facilitated, compared with the known arrays of the prior art, in which the casing was made of zirconium alloy.

The array according to the invention is therefore of very simple construction, while at the same time making it possible to obtain a constant moderating ratio in the cross-sections of the array.

It is also possible to envisage a prism-shaped casing, the cross-section of which has a shape different from the hexagonal shape shown in the drawing and this casing can contain fissile or fertile fuel rods in a arrangement different from that which has been described.

The invention applies both in the case of fissile arrays and in the case of fertile arrays mainly containing a material which is capable of producing fissile material under the action of neutron bombardment.

Finally, the fuel array according to the invention can be used in all undermoderated reactors, irrespective of the moderating liquid used.

We claim:

1. In an undermoderated light water moderated and cooled nuclear reactor comprising a core which consists of a plurality of fuel arrays of identical cross-section arranged side by side and comprising first fuel arrays which are located in a central portion of said core and which contain fissile enriched fuel material and second fuel arrays which are located at the periphery of said core and which contain fertile material only, each of said arrays having:

a prism shaped casing of regular polygonal cross section having lateral walls whose external surface is planar; and a plurality of long cylindrical rods containing fissile enriched material in said first fuel arrays and containing fertile material only in said second arrays, said rods being arranged parallel to an axis of said casing and in a uniform triangular lattice within said casing, with a spacing between said rods which is so selected that the neutron flux in said core during operation of said reactor is epithermal;

the improvement consisting in that a plurality of parallel channels are formed out of an internal initially flat surface of said lateral walls, each channel being part cylindrical and coaxial to an associated one of those of said rods which are placed in an outside row of the array, each of said rods having a spacing wire helically wound thereof for determining the spacing between adjacent ones of said rods and between the rods in the external row and the respective channels, said channels being so sized that the moderation ratio is substantially constant throughout a cross-sectional area of said array.

2. In an undermoderated light water moderated and cooled nuclear reactor comprising a core which consists of a plurality of fuel arrays of identical cross-section arranged side by side and comprising first fuel arrays located in a central portion of said core and which contain fissile enriched fuel material and second fuel arrays which are located at the periphery of said core and which contain natural or depleted uranium only, each of said arrays having:

a prism shaped casing of regular polygonal cross section having lateral walls whose external surface is planar; and a plurality of long cylindrical rods containing fissile enriched material in said first fuel arrays and fertile material only in said second arrays, said rods being arranged parallel to an axis of said casing and in uniform polygonal pattern within said casing, with a spacing between said rods which is so selected that the neutron flux in said core during operation of said reactor is epithermal;

the improvement consisting in that a plurality of parallel channels are formed out of an internal surface of said lateral walls, each channel being part cylindrical and coaxial to an associated one of those of said rods which are placed in an outside row of the array, the radial spacing between each of said channels and the associated one of said rods being substantially equal to the spacing between two adjacent ones of said rods in said array, whereby the moderation ratio is substantially constant throughout a cross-sectional area of said array.

3. Improvement according to claim 2, wherein the mutual spacing between said rods and the spacing between said rods in the outside row and the channels are so selected that the moderation ratio is about 0.60 at the periphery of the array while the average moderation ratio in the remainder of the array is 0.51.

4. Improvement according to claim 2, wherein each said first array includes fissile fuel, and wherein at least some of said fuel rods which are arranged at the periphery of said first fuel array contain fertile material of the group consisting of natural and depleted uranium while the other of said fuel rods contain fissile material.

5. Improvement according to claim 1, in the case where said array is a fissile array, wherein at least some of the peripheral rods (7) of said array, arranged in corners of said casing (1), contain fuel pellets impregnated with a consumable poison, of the group comprising samarium and gadolinium.

* * * * *